United States Patent [19]

Shiraki et al.

[11] Patent Number: 5,234,994
[45] Date of Patent: Aug. 10, 1993

[54] THERMOPLASTIC POLYMER COMPOSITION

[75] Inventors: Toshinori Shiraki, Yamato; Yasuo Hattori; Susumu Hoshi, both of Yokohama; Haruhisa Nagano, Kawasaki, all of Japan

[73] Assignee: Asani Kasei Kogyo Kabushiki Kaisha, Osaka, Japan

[21] Appl. No.: 428,888

[22] Filed: Oct. 30, 1989

[30] Foreign Application Priority Data

Nov. 1, 1988 [JP] Japan .................. 63-274470
Nov. 24, 1988 [JP] Japan .................. 63-294715
Aug. 23, 1989 [JP] Japan .................. 1-215062

[51] Int. Cl.$^5$ .................. C08L 53/02; C08L 71/12
[52] U.S. Cl. .................. 525/92; 525/392; 525/396; 525/397; 525/905
[58] Field of Search .................. 529/92, 905, 392, 396, 529/397

[56] References Cited

U.S. PATENT DOCUMENTS 4,879,330  11/1989  De Munck et al. .................. 525/92

FOREIGN PATENT DOCUMENTS

| 0048397 | 3/1982 | European Pat. Off. |
|---------|--------|---------------------|
| 0151780 | 8/1985 | European Pat. Off. |
| 0263678 | 4/1988 | European Pat. Off. .......... 525/92 |
| 48-62851 | 11/1972 | Japan . |
| 50-71742 | 6/1975 | Japan . |
| 52-125560 | 3/1976 | Japan . |
| 51-129450 | 11/1976 | Japan . |
| 53-94540 | 8/1978 | Japan . |
| 54-27025 | 9/1979 | Japan . |
| 56-95949 | 8/1981 | Japan . |
| 58-176240 | 10/1983 | Japan . |
| 61-223054 | 10/1986 | Japan . |
| 62-70448 | 3/1987 | Japan . |

*Primary Examiner*—Jacob Ziegler
*Attorney, Agent, or Firm*—Birch, Stewart, Kolasch & Birch

[57] ABSTRACT

A thermoplastic polymer composition containing:
(a) 10 to 95 parts by weight of a block copolymer which comprises at least two polymer segments comprised primarily of a vinyl aromatic hydrocarbon and at least one polymer segment comprised primarily of a conjugated diene, in which:
  (i) the content of the vinyl aromatic hydrocarbon is more than 60% by weight and 95% by weight;
  (ii) the weight ratio of the vinyl aromatic hydrocarbon present in the copolymer as the vinyl aromatic hydrocarbon polymer block to the total vinyl aromatic hydrocarbons present in the copolymer is more than 0.75% to 0.98%; and
  (iii) the ratio of the weight average molecular weight to the number average molecular weight of the vinyl aromatic hydrocarbon polymer block in the copolymer is 1.2 to 2.0 and
(b) 5 to 90% by weight of polyphenylene ether, and, optionally,
(c) 3 to 400 parts by weight, based on 100 parts by weight of the total weight of said components (a) and (b), of polystyrene.

23 Claims, 4 Drawing Sheets

THERMOPLASTIC POLYMER COMPOSITION

BACKGROUND OF THE INVENTION

1. Field of the Invention

The present invention relates to a thermoplastic polymer composition which is superior in transparency, impact resistance, surface hardness, heat resistance, and gloss and with little warping.

2. Description of the Related Art

Block copolymers comprised of conjugated dienes and vinyl aromatic hydrocarbons are superior in transparency when the content of the vinyl aromatic hydrocarbons is relatively high and provide a thermoplastic resin with better impact resistance than polystyrene. Accordingly, these block copolymers have increasingly been used in recent years in the fields of food packaging, sundry goods for daily use, toys, home appliance components, and the like. However, these block copolymers have the defect of being poorer than other plastics in their surface hardness and heat resistance.

On the other hand, polyphenylene ether resins are superior in dimensional stability, electrical characteristics, resistance to heat deformation under high loads, waterproofness, and the like and are therefore widely used in industry. However, such polyphenylene ether resins have the defect of being inferior in impact resistance and processability during molding.

Therefore, various attempts have been made to blend the two with the object of taking advantage of the respective merits of block copolymers comprised of conjugated dienes and vinyl aromatic hydrocarbons and polyphenylene ether resins and to compensate for their mutual defects.

For example, Japanese Unexamined Patent, Publication (Kokai) No. 48-62851 (i.e., DE-A-2255930) and Japanese Unexamined Patent Publication (Kokai) No. 51-129450 (i.e., GB-A-1532455) disclose normally rigid thermoplastic compositions comprised of (a) polyphenylene ether resins, (b) A-B-A' type elastomer block copolymers wherein the central block B has a molecular weight which is larger than the combined molecular weights of the end blocks A and A', and (c) styrene homopolymers or random copolymers. Further, Japanese Unexamined Patent Publication (Kokai) No. 52-125560 (i.e., GB-A-1522458) discloses a thermoplastic molding composition comprised of a homogeneous mixture of (i) a polyphenylene ether resin, (ii) a styrene resin, and (iii) a radial tereblock copolymer. Further, Japanese Unexamined Patent Publication (Kokai) No. 58-176240 discloses a thermoplastic resin composition comprised primarily of 1 to 20 parts by weight of a block copolymer comprised of 10 to 60 parts by weight of a vinyl aromatic compound and 40 to 90 parts by weight of a conjugated diene, based on 100 parts by weight of a modified polyphenylene oxide resin. However, the block copolymers used in these compositions are block copolymers having a content of the vinyl aromatic compounds of 60% by weight or less and these compositions are inferior in transparency, surface hardness, heat resistance, and gloss.

On the other hand, Japanese Examined Patent Publication (Kokoku) No. 54-27025 (i.e., U.S. Pat. No. 3,639,508) discloses a thermoplastic composition containing (A) 1 to 45% by weight of a polyallylene oxide and (B) 99 to 55% by weight of a block copolymer having 10 to 90% by weight of at least one type of monovinyl aromatic block. It describes a composition using a block copolymer with a content of the vinyl aromatic compound of 80% by weight. However, the composition has the problems of being inferior in impact resistance and susceptible to the occurrence of microcracks when bent. Further, Japanese Unexamined Patent Publication (Kokai) No. 61-223054 and Japanese Unexamined Patent Publication (Kokai) No. 62-70448 disclose impact resistant polyphenylene ether resin compositions containing (a) polyphenylene ether resins, (b) A-B-A' type block copolymers wherein the block B has a molecular weight that is smaller than the combined molecular weights of the blocks A and A,), and (c) an elastomer. However, these compositions have the problem that, while being superior in impact resistance, they are inferior in transparency and surface hardness.

Further, Japanese Unexamined Patent Publication (Kokai) No. 50-71742 (i.e., GB-A-1477706), Japanese Unexamined Patent Publication (Kokai) No. 53-94540 (i.e., GB-A-1559052) and Japanese Unexamined Patent Publication (Kokai) No. 56-95949 (i.e., U.S. Pat. No. 4,309,514) disclose compositions comprised of (a) polyphenylene ether resins, (b) styrene resins, and (c) hydrogenated block copolymers. However, the block copolymers used in these compositions have a content of the vinyl aromatic hydrocarbons of 60% by weight or less and are thus inferior in transparency, surface hardness, heat resistance, and gloss.

SUMMARY OF THE INVENTION

Accordingly, the objects of the present invention are to eliminate the above-mentioned disadvantages of the prior art and to provide a thermoplastic polymer composition which is superior in transparency, impact resistance, surface hardness, heat resistance (or resistance to heat deformation), and gloss and with little warping.

Other objects and advantages of the present invention will be apparent from the following description.

In accordance with the present invention, there is provided a thermoplastic polymer composition comprising:

(a) 10 to 95 parts by weight of a block copolymer which comprises at least two polymer segments composed mainly of a vinyl aromatic hydrocarbon and at least one polymer segment composed mainly of a conjugated diene, in which block copolymer:

(i) the content of the vinyl aromatic hydrocarbon is more than 60% by weight and not more than 95% by weight based on the weight of the block copolymer;

(ii) the weight ratio of the vinyl aromatic hydrocarbon present, as a vinyl aromatic hydrocarbon polymer block, in the block copolymer to the total vinyl aromatic hydrocarbons present in the block copolymer is more than 0.75 and up to 0.98, and (iii) the ratio of the weight average molecular weight to the number average molecular weight of the vinyl aromatic hydrocarbon polymer block in the block copolymer is 1.2 to 2.0 and (b) 5 to 90% by weight of a polyphenylene ether.

BRIEF DESCRIPTION OF THE DRAWINGS

The present invention will be better understood from the description set forth below with reference to the accompanying drawings wherein.

DESCRIPTION OF THE PREFERRED EMBODIMENTS

Figure 1:
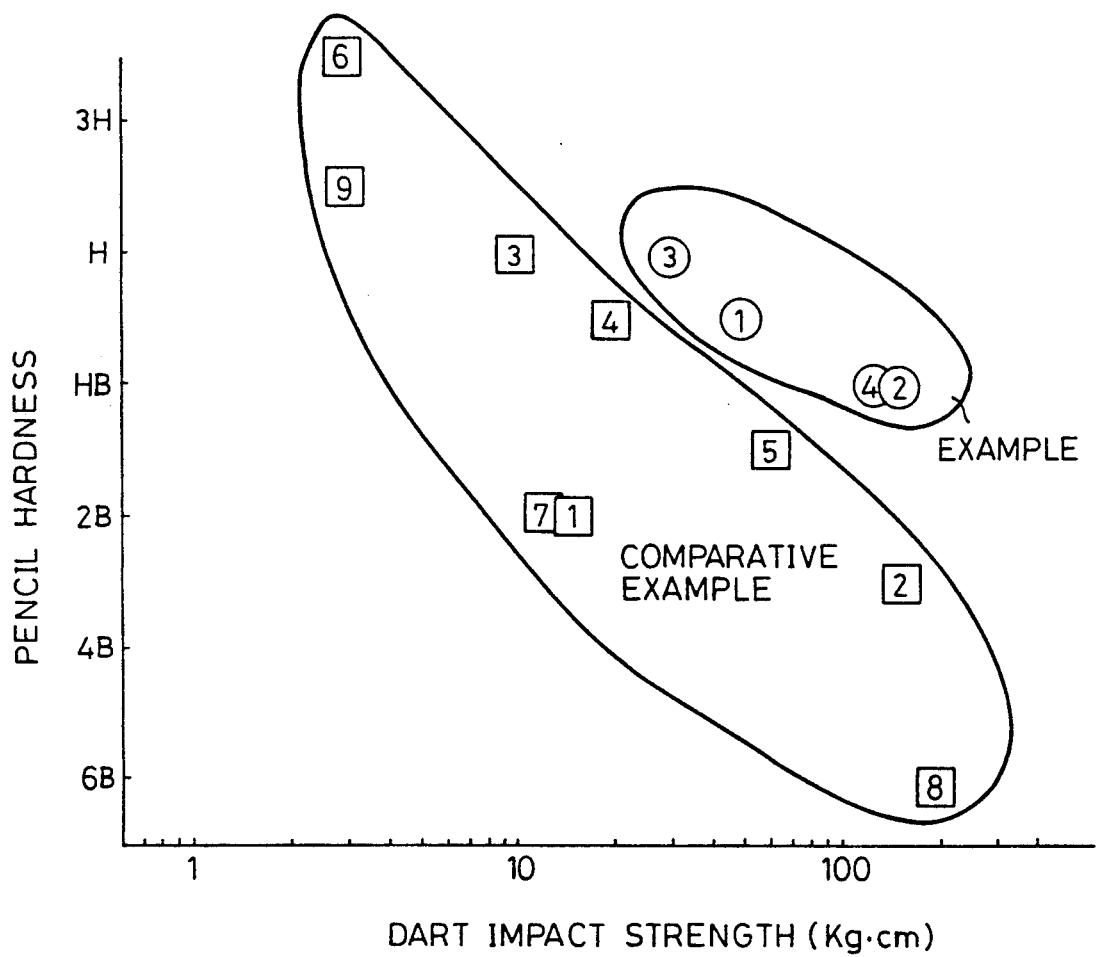
FIG. 1 graphically illustrates the correlation between the dart impact strength and the pencil hardness of the thermoplastic polymer composition.

The present invention will be explained in detail hereinbelow.

The block copolymer of the component (a) used in the present invention comprises at least two polymer segments composed mainly of vinyl aromatic hydrocarbons and at least one polymer segment composed mainly of conjugated dienes. The content of the vinyl aromatic hydrocarbon, based on the weight of the block copolymer is over 60% by weight and 95% by weight or less, preferably from 65 to 90% by weight. When the content of the vinyl aromatic hydrocarbon is 60% by weight or less, the surface hardness, heat resistance, and gloss are inferior and when the content is more than 95% by weight, the impact resistance is inferior, and thus these contents are not preferred. Further, in the present invention, the polymer segment composed mainly of vinyl aromatic hydrocarbons means a polymer segment having 50% by weight or more of a vinyl aromatic hydrocarbon, preferably 70% by weight or more. It is a segment comprised of a copolymer block of a vinyl aromatic hydrocarbon and a conjugated diene and a homopolymer block of a vinyl aromatic hydrocarbons or a segment composed of a homopolymer block of a vinyl aromatic hydrocarbon. Further, the polymer segment composed mainly of a conjugated dienes means a polymer segment having a content of a conjugated diene based on the weight of the block copolymer of more than 50% by weight, preferably 70% by weight or more. It is a segment composed of a copolymer block of a conjugated diene and a vinyl aromatic hydrocarbon and/or a homopolymer block of a conjugated diene. The vinyl aromatic hydrocarbons copolymerized in the copolymer blocks in these segments may be uniformly distributed or may be distributed in a tapered form. Further, said copolymer blocks may have a plurality of coexisting portions with vinyl aromatic hydrocarbons uniformly distributed and/or portions with them distributed in a tapered form.

The block copolymer of the component (a) used in the present invention has a weight ratio of the vinyl aromatic hydrocarbons present in the said block copolymer as the vinyl aromatic hydrocarbon polymer block to the total vinyl aromatic hydrocarbons contained in the block copolymer (hereinbelow, referred to as the block ratio of the vinyl aromatic hydrocarbons) of more than 0.75 by weight and up to 0.98, preferably from 0.77 to 0.96, more preferably 0.80 to 0.95. When the block ratio of the vinyl aromatic hydrocarbons is 0.75 or less, the surface hardness and heat resistance are inferior and when over 0.98, the impact resistance is inferior, and thus, these block ratios are not preferred. The block ratio of the vinyl aromatic hydrocarbons may be determined by the method for oxidation decomposition of copolymers using osmium tetraoxide as a catalyst and using di-tertiary-butyl hydroperoxide (for example, the method disclosed by L. M. Kolthoff et al., J. Polymer Sci., 1, 429 (1946)). After the block copolymer is decomposed by oxidation by the above-mentioned method, a large amount of methanol is added to the decomposition product to obtain the vinyl aromatic hydrocarbon polymer component (in general, having a number average molecular weight of about 1000 or more, preferably about 3000 to 1,000,000, more preferably about 5000 to 1,000,000), the amount of which is divided by the amount of the total vinyl aromatic hydrocarbons contained in the block copolymer, whereby it is possible to determine the block ratio of the vinyl aromatic hydrocarbons.

Further, the block copolymer of the component (a) used in the present invention has a ratio of the weight average molecular weight (hereinafter referred to as the $\overline{M}w$) to the number average molecular weight (hereinafter referred to as the $\overline{M}n$) of the vinyl aromatic hydrocarbon polymer block in the block copolymer of, 1.2 to 2.0, preferably in the range of 1.3 to 1.8. When the ratio of $\overline{M}w/\overline{M}n$ is less than 1.2, the impact resistance is inferior and when more than 2.0, anistrophy in molding occurs causing the problem of warping of the molded product. The $\overline{M}w/\overline{M}n$ of the vinyl aromatic hydrocarbon polymer block in the block copolymer may be determined in the following manner: Specifically, the vinyl aromatic hydrocarbon polymer component obtained by oxidation decomposition of the block copolymer by the above-mentioned method may be determined by gel permeation chromatograph (GPC) and calculated in accordance with a usual method (for example, the method disclosed in "Chromatography <Basics>," published by Kodansha). The calibration curve used in the GPC may be prepared using standard polystyrene commercially available for GPC use.

The block copolymer which is especially preferable as the block copolymers of the component (a) used in the present invention is the block copolymer having a glass transition temperature (Tg) of the polymer segment composed principally of vinyl aromatic hydrocarbons of 65° to 98° C., preferably 75° to 96° C. When a block copolymer having a Tg in this range is used, a composition is obtained with little occurrence of microcracks as seen when bending the composition. Further, the Tg used herein defines the temperature found from the point of inflection of the dynamic modulus of elasticity (E') in the measurement of the dynamic elastoviscosity or the temperature found from the point of inflection of the temperature change in a differential scanning calorimeter (DSC). The dynamic elastoviscosity may be measured using, for example, a Rheovibron (Model DDV-3) made by Toyo Baldwin.

The block copolymer of the component (a) used in the present invention may be a block copolymer with a polymer structure represented by the general formula

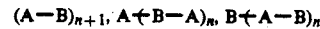

wherein, A is a polymer block comprising mainly a vinyl aromatic hydrocarbon and B is a polymer block comprising mainly a conjugated diene. The boundary between the A block and B block does not necessarily have to be clearly differentiated. Further, n is an integer of 1 or more, preferably an integer of 1 to 5, or the general formula:

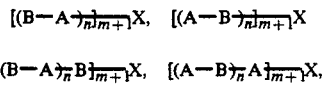

wherein, A and B are the same as mentioned above, X is, for example, a residual group of silicon tetrachloride, tin tetrachloride, polyepoxide such as epoxidized soybean oil, polyhalogenated hydrocarbons, carboxylic acid ester, polyvinyl compounds, or other coupling agents or a residual group of a polyfunctional organic lithium compound or other initiator, m and n are integers of 1 or more, preferably m is an integer of 1 to 10 and n is an integer of 1 to 5. The block copolymer used in the present invention may be any mixture of block copolymers expressed by the above-mentioned general formulae.

Examples of the vinyl aromatic hydrocarbon used in the method of the present invention are styrene, o-methylstyrene, p-methylstyrene, p-tert-butylstyrene, 1,3-dimethylstyrene, α-methylstyrene, vinylnaphthalene, vinyl anthracene. Of these styrene is generally used. These may be used alone or any mixtures thereof.

Examples of the conjugated dienes used in the present invention are diolefins such as 1,3-butadiene, 2-methyl-1,3-butadiene (i.e., isoprene), 2,3-dimethyl-1,3-butadiene, 1,3-pentadiene, 1,3-hexadiene. Of these 1,3-butadiene and isoprene are most preferably used. These may be used alone or mixture thereof.

The block copolymer used in the present invention may be obtained by polymerization in a hydrocarbon solvent using an organic lithium compound as an initiator.

Examples of the hydrocarbon solvent usable in the present invention are butane, pentane, hexane, isopentane, heptane, octane, isooctane, and other aliphatic hydrocarbons; cyclopentane, methylcyclopentane, cyclohexane, methylcyclohexane, ethylcyclohexane, and other alicyclic hydrocarbons; benzene, toluene, ethylbenzene, xylene, and other aromatic hydrocarbons. The organic lithium compound usable in the present invention, is an organic lithium compound with one or more lithium atoms bonded in the molecule and may be, for example, ethyl lithium, n-propyl lithium, isopropyllithium, n-butyl lithium, sec-butyl lithium, tert-butyl lithium, hexamethylene dilithium, butadienyl dilithium, isoprenyl dilithium.

In the block copolymer of the component (a) used in the present invention, the number average molecular weight of the segment A is 5,000 to 500,000, preferably 70,000 to 300,000, while the number average molecular weight of the segment B is 1,000 to 400,000, preferably 3,000 to 300,000. Further, the number average molecular weight of the block copolymer as a whole is 10,000 to 1,000,000, preferably 30,000 to 500,000.

The block copolymer used in the present invention may be a block copolymer having a polar group-containing atomic group at least at one polymer chain end of the block copolymer (hereinafter abbreviated as an end-modified block copolymer). The polar group-containing atomic group mentioned here means an atomic group containing at least one kind of atom selected from nitrogen, oxygen, silicon, phosphorus, sulfur, or tin. Specifically, mention may be made of an atomic group containing at least one type of polar group selected from the carboxyl group, carbonyl group, thiocarbonyl group, acid halide group, acid anhydride group, carboxlic acid group, thiocarboxylic acid group, aldehyde group, thioaldehyde group, carboxylic acid ester group, amide group, sulfonic acid group, sulfonic acid ester group, phosphoric acid group, phosphoric acid ester group, amino group, imino group, nitrile group, pyridyl group, quinoline group, epoxy group, thioepoxy group, sulfide group, isocyanate group, isothiocyanate group, silicon halide group, alkoxy silicon group, tin halide group, alkyl tin group, phenyl tin group or the like. More specifically, use may be made of the end modified block copolymer described in EP-A-245504.

In the present invention, it is possible to use hydrogenated block copolymer of the afore-mentioned block copolymer or end-modified block copolymer. Examples of the catalyst usable for the hydrogenation reaction are (1) supported or carried type heterogeneous catalysts wherein Ni, Pt, Pd, Ru, or other metals are carried in carbon, silica, alumina, diatomaceous earth, or other support and (2) so-called Ziegler catalysts using Ni, Co, Fe, Cr, or other organic acid salts or acetylacetone salts and organic aluminum or other reducing agents or so-called organic complex catalysts or other homogeneous catalysts such as Ru, Rh, or other organic metal compounds. The specific methods disclosed in, for example, Japanese Examined Patent Publication (Kokoku) No.42-8704 (i.e., DE-A-1222260), Japanese Examined Patent Publication (Kokoku) No. 43-6636 (i.e., U.S. Patent No. 3333024), or Japanese Unexamined Patent Publication (Kokai) No. 59-133203 (i.e., U.S. Pat. No. 4,501,857) and Japanese Unexamined Patent Publication (Kokai) No. 60-22014 (i.e., U.S. Pat. No. 4,673,714) can be used in the present invention. According to these methods, hydrogen is added in an inert medium in the presence of a hydrogenation catalyst to obtain a hydrogenated product and synthesize a hydrogenated polymer for use in the present invention. The hydrogenated ratio of the aliphatic double bond based on the conjugated diene compound in the polymer may be controlled to any desired value by, for example, adjusting the reaction temperature, the reaction time, the amount of hydrogen supply, the amount of the catalyst, etc. For example, when trying to improve the resistance to heat deterioration while maintaining the properties of the nonhydrogenated polymer, it is recommended to hydrogenate the aliphatic double bonds, based on the conjugated dienes, by 3% to less than 80%, preferably from 5% to less than 75%, more preferably from 10 to 45%. When trying to improve the resistance to heat deterioration and the weather resistance, it is preferably to hydrogenate to 80% or more, preferably 90% or more. In this case, there are no particular limitations to the hydrogenated ratio of the aromatic double bonds based on the vinyl aromatic compounds copolymerized with the polymer block A comprising mainly the vinyl aromatic compounds and, in accordance with need, the polymer block B comprising mainly the conjugated dienes, but it is preferable to make the hydrogenated ratio 20% or less. The amount of the nonhydrogenated aliphatic double bonds contained in said hydrogenated block copolymers can be easily determined by, for example, an infrared spectrometer, a nuclear magnetic resonance apparatus and the like.

Next, the polyphenylene ether of component (b) of the thermoplastic polymer composition used in the present invention may be a homopolymer comprising repeating units expressed by the general formula:

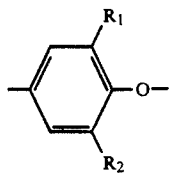

wherein, at least one of $R_1$ and $R_2$ is a linear chain or primary or secondary branch chain $C_1$–$C_4$ alkyl group, aryl group, halogen atom, or hydrogen atom, which may be the same or different;

a copolymer comprised of repeating units expressed by the above-mentioned general formula (I) and the repeating units expressed by the general formula:

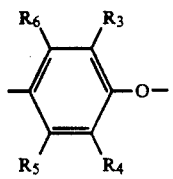

wherein, $R_3$, $R_4$, $R_5$, and $R_6$ are each a linear chain or primary or secondary branch chain $C_1$–$C_4$ alkyl groups, aryl groups, halogen atoms, hydrogen atoms, which may be the same or mutually different, except that $R_3$ and $R_4$ are not simultaneously a hydrogen atom, a graft copolymer formed by graft polymerization of styrene with the homopolymer or copolymer and the like.

Typical examples of the homopolymers of the polyphenylene ether may be poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether, poly(2-methyl-6 chloroethyl-1,4-phenylene)ether, and other similar homopolymers.

The polyphenylene ether copolymer may include a polyphenylene ether copolymers composed principally of a polyphenylene ether structure obtained by copolymerization with o-cresol or 2,3,6-trimethylphenol or other alkyl substituted phenols expressed by the general formula:

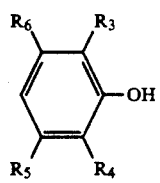

wherein, $R_3$, $R_4$, $R_5$, and $R_6$ are each the same as defined above.

The number average degree (n) of polymerization of the polyphenylene ether is selected from the range of 50 to 500, preferably 75 to 250. With a number average degree of polymerization of less than 50, the resultant compositions are remarkably reduced in impact strength and other physical properties and are not suited for practical use. Further when more than 500, the resultant compositions are inferior in processability and easily gel and are thus not preferable.

The polyphenylene ether used in the present invention may be a modified polyphenylene ether formed by addition and/or graft polymerization of a radical polymerizable vinyl compound with the above-mentioned homopolymers or copolymers. The vinyl compound may be the afore-mentioned vinyl aromatic hydrocarbons and their halogen substituents, acrylic acid esters, methacrylic acid esters, and other unsaturated monocarboxylic acid esters, acrylic acid amides, methacrylic acid amides, and other unsaturated carboxylic acid amides, maleic acid, fumaric acid, itaconic acid, and other unsaturated dicarboxylic acids, or acid anhydrides of these unsaturated dicarboxylic acids, esters amides, imides, acrylonitriles, methacrylonitriles and other nitrile monomers and the like.

When the polyphenylene ether having a stabilizing end group is used in the present invention, the polymer composition having a light color or the molded article therefrom having a light color can be preferably obtained. Typical examples of the end groups of the polyphenylene ether having a stabilizing end group are represented by the general formula (IV):

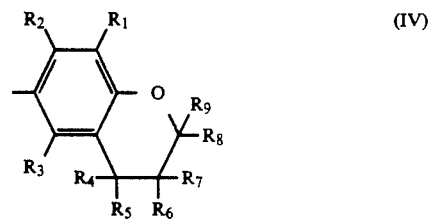

wherein, $R_1$ to $R_5$ are independently hydrogen, an alkyl group, substituted alkyl group, halogen group, aryl group, or substituted aryl group, $R_6$ to $R_9$ are independently hydrogen, an alkyl group, substituted alkyl group, alkenyl group, substituted alkenyl group, halogen group, aryl group substituted aryl group, alkoxyl group, N-lactam group, carboxylic acid group, carboxylic acid anhydride group, carboxylic acid ester group, carboxylic acid amide group, nitrile group, acyloxyl group, or acyl group. Note that $R_6$ and $R_7$ and $R_8$ and $R_9$ may be independently bonded to form spirocyclic structure rings. The above-mentioned stabilizing end group may preferably include such groups in which the average number of the end group is 0.01 or more, based on 100 phenylene ether units.

The polyphenylene ether cyclized with the above-mentioned end structure, namely 6-chroman skeleton is extremely suitable for providing a composition with an extremely high degree of stability during molding, resistant to thermal oxidation, and clear or light color.

In the stabilized polyphenylene ether used in the present invention, it is preferably that there be contained an average of 0.01 or more cyclic end groups having the general formula (IV) with respect to 100 phenylene ether units constituting the resin.

In the case of the resin used as an engineering plastic, of which average molecular weight is about 10,000 to 30,000, it is preferable that the cyclic end groups be present in an amount of an average 0.15 or more with respect to 100 phenylene ether units. More preferably, they are present in an amount of an average 0.2 or more. There is no particular upper limit of the amount of the cyclic end groups in that it is a case of the more the better in terms of the resistance to deterioration by thermal oxidation. Further, a resin in which all of its end groups are of the structure of the general formula (IV) is also extremely stable as a resin.

The stabilized polyphenylene ether resin used in the present invention may be produced as follows:

That is, the polyphenylene ether polymer having end group having the general formula (V):

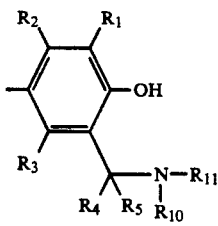
(V)

wherein, $R_1$ to $R_5$ are each the same as defined in the formula (IV) and $R_{10}$ and $R_{11}$ are independently hydrogen, an alkyl group, or a substituted alkyl group, but are not simultaneously hydrogen, may be heated to a temperature over the glass transition temperature of the polyphenylene ether polymer with a compound having a carbon-carbon double bond (hereinafter referred to as an unsaturated compound) having the general formula (VI)

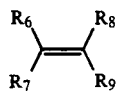
(VI)

wherein, $R_6$ to $R_9$ are each in the absence of the same as those defined in formula (IV) in the absence of a radical initiator so as to produce the stabilized polyphenylene ether resin of the present invention.

A polyphenylene ether having such end groups (V) may be obtained by oxidative coupling polymerization or copolymerization of a phenol compound having at least one benzyl position hydrogen at an ortho-position of a hydroxyl group (i.e., a phenol compound including the above-mentioned structure (I)) in the presence of a catalyst containing a primary or secondary amine for example, U.S. Pat. No. 4,788,277).

Further, as specific examples of the unsaturated compound (VI), mention may be made of styrene, α-methylstyrene, chlorostyrene, methylstyrene, stilbene, cinnamic alcohol, benzal acetone, ethyl cinnamate, nitrile cinnamate, 4-vinylpyridine, 2-vinyl-3,5-diamino-(s)-triazine, and the like.

In the present invention, it is possible to use a polymer of the above-mentioned vinyl aromatic hydrocarbons or a copolymer with the above-mentioned vinyl aromatic hydrocarbons and a copolymerizable vinyl compound (hereinafter, referred to as the component (c). As the copolymerizable monomer, use may be made of the above-mentioned vinyl compounds. The (co)polymer preferable as the component (c) may be a styrenic polymer such as polystyrene styrene-α-methylstyrene copolymer, acrylonitrile-styrene copolymer, styrene-ester methacrylate copolymer, styrene-anhydrous maleic acid copolymer and the like. These may be used alone or in any mixture thereof. The (co)polymers are effective in further improving the surface strength and rigidity of the compositions.

Further, in the present invention, it is possible to mix in a rubber-modified vinyl aromatic hydrocarbon polymer (hereinafter referred to as component (d)). The rubber-modified vinyl aromatic hydrocarbon polymer may be obtained by polymerization of the above-mentioned vinyl aromatic hydrocarbon or a mixture of a monomer copolymerizable therewith and an elastomer. As the method of polymerization, suspension polymerization, emulsion polymerization, mass polymerization, mass-suspension polymerization and the like may be used. Examples of the monomers copolymerizable with the vinyl aromatic hydrocarbon, may be α-methylstyrene, acrylonitrile, acrylic acid ester, methacrylic acid ester, anhydrous maleic acid, and other of the above-mentioned vinyl compounds. Further, examples of the elastomers usable in the present invention may be natural rubber, synthetic isoprene rubber, butadiene rubber, styrene-butadiene rubber, high styrene rubber, polybutadiene rubber, chloroprene rubber, polybutene rubber, rubbery ethylene-propylene copolymers, rubbery butadiene-acrylonitrile copolymers, butyl rubber, various nitrile rubbers, rubbery ethylene-vinyl acetate copolymers, rubbery ethylene acrylic acid ester copolymers, rubbery atactic polypropylene resins, rubbery ethylene-acrylic acid ionomer and the like.

These elastomers are dissolved in the monomer in general in an amount of 2 to 70 parts by weight, based on 100 parts by weight of the vinyl aromatic hydrocarbons or monomers copolymerizable with the same, more generally 3 to 50 parts by weight or are supplied to the mass polymerization, mass-suspension polymerization, emulsion polymerization and the like in a latex form.

Examples of the particularly preferable rubber modified polymers usable in the present invention may be impact resistant rubber-modified styrene polymers, acrylonitrile butadiene-styrene copolymers, acrylic acid ester-butadiene-styrene copolymers, methacrylic acid ester-butadiene styrene copolymers, impact resistant rubber modified styrene anhydrous maleic acid copolymers. These may be used alone or in any mixture thereof.

In the present invention, the weight ratio of the mixture of the component (a) to the component (b) is 10 to 95% by weight of component (a), preferably 20 to 85% by weight, more preferably 30 to 80% by weight. When the component (a) is less than 10% by weight, the impact resistance and processability are inferior and when more than 95% by weight, the heat resistance and surface hardness are inferior, and thus, these weight percentages are not preferred. The particularly preferable weight ratio of mixture is 35 to 75% by weight of the component (a). In this range, the operation and effect of giving a composition having an impact resistance which is superior to the impact resistance strength of the component (a) and the component (b) alone, were found to be totally unexpected.

Further, in the present invention, it is possible to mix in the above-mentioned component (c) in an amount of up to 500 parts by weight, preferably 3 to 400 parts by weight, more preferably 5 to 300 parts by weight, based on 100 parts by weight of the composition comprised of the component (a) and the component (b). The component (c) can be used to improve the processability. When the amount of the component (c) formulated is more than 500 parts by weight, the impact resistance and heat resistance fall, and thus this amount is not preferred.

Further, in the present invention, it is possible to mix in the above-mentioned component (d), in an amount of up to 500 parts by weight, preferably 3 to 400 parts by weight, more preferably 5 to 300 parts by weight, with respect to 100 parts by weight of the composition comprised of the component (a) and the component (b), so as to improve the impact resistance. When the amount of the component (d) formulated is more than 500 parts by weight, the heat resistance falls, so that this is not preferred. Further, when desiring to obtain a composition with a good transparency, it is recommended that the amount of the component (d) formulated be 50 parts by weight or less, preferably 25 parts by weight or less.

It is possible to formulate about 50 parts by weight or less, based on 100 parts of the components (a) and (b), of other thermoplastic resins or rubbery polymers into the thermoplastic polymer composition of the present invention. Examples of the thermoplastic resins, usable in he present invention may be polyethylene, copolymers of ethylene containing 50 percent or more ethylene, copolymers of this with other copolymerizable monomers, polypropylene, copolymers of propylene, containing 50 percent or more propylene, copolymers of this with other copolymerizable monomers, polybutene resins, polyvinyl chloride resins, polyvinyl acetate resins, their hydrolyzed products, polyacrylate resins, acrylonitrile resins, polyamide resins, polyester resins, polyphenylene sulfide resins, polyacetal resins, polycarbonate resins, polysulfone resins, thermoplastic polyurethane resins, polybutadiene resins, polyacrylate resins, fluorine resins, polyoxybenzoyl resins, polyimide resins, etc. Further, as the rubbery polymers, mention may be made of polybutadiene, polyisoprene, styrene-butadiene copolymers, butadiene-acrylonitrile copolymers, ethylene-propylene copolymers, ethylene-propylene copolymers, ethylene-propylene-diene copolymers, silicone rubber, epichlorohydrin rubber, acryl rubber, ethylene-vinyl acetate copolymers, etc.

The thermoplastic polymer composition of the present invention may, optionally, include any conventional additives. The types of the additives are not particularly limited and may be any generally used for formulation with plastics. Examples of the additives may be glass fiber, glass beads, silica, calcium carbonate, talc, and other inorganic reinforcers, organic fibers, coumarone-indene resins, and other organic reinforcers, organic peroxides, inorganic peroxides, and other cross-linking agents, titanium white, carbon black, iron oxide, and other pigments, dyes, flame retardants, antioxidants, UV absorbers, antistatic agents, lubricants, plasticizers, other thickeners or mixtures of the same.

The thermoplastic polymer composition of the present invention may be produced by any of the conventionally known methods. For example, use may be made of the melt kneading method using open rolls, intensive mixers, internal mixers, cokneaders, twin rotor equipped continuous kneaders, extruders, and other general mixers, the method of dissolving or dispersing and mixing the components in a solvent, then heating to remove the solvent.

Examples of the components of data processing equipment according to the present invention are components of word processors, facsimiles, copiers, printers, typewriters, office computers, personal computers, minicomputers, and other data recording and processing equipment and also containers and/or container parts for holding audio and visual recording magnetic tape, IC's, and other data recording and processing media, magnetic cards, IC cards, and other data recording and processing cards. Typical examples of molded articles used as components for data equipment are as follows: examples of molded articles for components of word processors are the external housing, control panel, keytops, switches, lever holders, sensor holders, paper guides, plachire holders, sliders, chassises, viewing windows, sound covers, protective covers, and other covers, etc. As the shaped articles used for components of facsimiles, mention may be made of external housings, switches and buttons, panels, chassises, spencer guides, receiver frames, transmitter frames, recording paper boxes, viewing windows, sound covers, protective covers, and other covers, etc. As the shaped articles used for the components for copiers, mention may be made of top covers, front-back and right-left control covers, paper holding covers, internal covers, front covers, operating surface covers, sound covers, protective covers, and other covers, display panels, and buttons, control panels, flanges for photosensitive media, cleaner housings, containers and bottles for recovery of developers, boxes for developer, handles, attachment and release levers, toner box covers, lens housings, light shielding plates, mirror holding plates, static insulators, shields, paper containers, paper container covers, paper guides, copy receivers, chutes, frames. Examples of the molded articles used for printer components are upper and lower external housings, display panels, cassette housings, cassette covers, cassette guides, paper covers, paper guides, hammer covers, lock lever knobs, select levers, platen knobs, carriages, carriage bases, printer bodies, viewing windows, sound covers, protective covers, and other covers. Examples of the molded articles used for typewriter components are knob caps, knobs, platen gears, carriage stop pins, paper ball levers, flat cables, adjusting levers, paper guides, hammer covers, lock lever knobs, correction levers, tape guides, ribbon holding plates, wheel guides, ribbon motor frames, ribbon winding shafts, daisy protectors, carriage transfer devices, runfeed gears, hood housings, sound covers, protective covers, switch box covers, and other covers, brand badges, model badges, paper guides, indicators, top covers, sun covers, eraser tables, check connector covers, control panels, key tops, viewing windows. Example of the molded articles used for office computer components, mention may be made of covers for key component housings, printer covers, CRT covers, protective covers, and other covers, gate guide plates, louvers, KB cases, fans, and viewing windows. Examples of the molded articles used for components for personal computers and minicomputers are key component housing covers, CRT covers, memory device housing covers, protective covers, and other covers, keyboard cases, fans, terminal boards, floppy insertion ports, knobs, relays, holders, connectors, and viewing windows. Among the above-mentioned equipment components, the particularly suitable molded articles according to the present invention are sound covers, protective covers, and other covers, viewing windows, paper containers, paper container covers, paper receivers, guides, frames, magnetic tape containers, IC containers, and other molded articles for which transparency is required.

As the methods for obtaining the molded articles of data equipment components of the present invention from the above-mentioned thermoplastic polymer compositions, any of the conventionally known mixing methods may be used, e.g., injection molding, extrusion, blow molding, calendering, lamination, vacuum molding, compressed air molding, foam molding, film making may be used.

The thermoplastic polymer compositions of the present invention may be used for various applications making use of their superior transparency, impact resistance, surface hardness, heat resistance and gloss, and optionally clear or light color. The compositions of the present invention may be molded and processes by extrusion, injection molding, hollow molding, and the like to form sheets, films, foam, and other various shaped injection molded products, hollow molded products, press molded products, vacuum molded products, and the like. For use for food packaging, components for home electric appliances, auto parts, industrial products, toys, and the like. In particular, due to the little warping of the compositions of the present invention when injection molded, they are suited for injection molding of flat molded articles, molded articles with many flat portions, and large sized molded articles.

The physical properties of the resultant injection molded products are shown in Table 1. The block copolymer composition within the scope of the present invention gives a molded article which is superior in transparency, impact resistance, heat resistance, and surface hardness and further is excellent in microcrack resistance and features low warping.

TABLE 1

|  | Example | Comparative Example | | | | | | | |
|---|---|---|---|---|---|---|---|---|---|
|  | 1 | 1 | 2 | 2-2 | 3 | 4 | 5 | 6 | 7 |
| Block copolymer | | | | | | | | | |
| Styrene content (wt %) | 80 | 80 | 80 | 80 | 80 | 80 | 80 | — | 80 |
| Block styrene content (%) | 93 | 93 | 60 | 70 | 100 | 93 | 93 | — | 93 |
| MI (G) (g/10 min) | 8 | 8 | 8 | 8 | 12 | 10 | 9 | — | 8 |
| Mw/Mn of polystyrene block | 1.3 | 1.3 | 1.7 | 1.5 | 1.6 | 1.1 | 2.6 | — | 1.3 |
| Tg (°C.) | 95 | 95 | 61 | 64 | 100 | 96 | 91 | — | 95 |
| Mixture ratio Cp wt · part | | | | | | | | | |
| Block copolymer | 68 | 98.6 | 68 | 68 | 68 | 68 | 68 | 0 | 100 |
| Polyphenylene ether *1 | 32 | 1.4 | 32 | 32 | 32 | 32 | 32 | 100 | 0 |
| Polystyrene *2 | 14 | 0.6 | 14 | 14 | 14 | 14 | 14 | 14 | 14 |
| Dart impact strength (Kg-cm) *3 | 50 | 15 | 150 | 140 | 10 | 20 | 62 | 2 | 12 |
| Pencil hardness *4 | F | 2B | 3B | 3B | H | F | B | 4H | 2B |
| Haze (%) *5 | 2 | 2 | 10 | 12 | 2 | 2 | 3 | 2 | 2 |
| Heart deformation temp. (°C.) *6 | 93 | 70 | 65 | 69 | 96 | 94 | 81 | 170 | 72 |
| Microcracking *7 | ⊙ | ○ | ○ | ○ | x | ○ | ○ | x | ○ |
| Warping of molded article *8 | ⊙ | ○ | ○ | ○ | ○ | ○ | x | ○ | ○ |

EXAMPLES

The present invention will now be further illustrated by, but is by no means limited to, the following Examples.

EXAMPLE 1 AND COMPARATIVE EXAMPLES 1 TO 7

A styrene-butadiene block copolymer with a polymer structure represented by the general formula $A_1$-B-$A_2$ was produced in cyclohexane using n-butyl lithium as a catalyst. In the manufacture of the block copolymer, the Mw/Mn was adjusted by changing the ratio of the amount of the styrene used for the portion $A_1$ and the amount of the styrene used for the portion $A_2$. The block ratio of the styrene was adjusted by changing the ratio simultaneously with the continuous supply to the polymerization vessel of the mixed monomer of styrene and butadiene as the monomer of the portion B. Further, the melt flow index (MI (G)) was adjusted by changing the amount of the n-butyl lithium. The resultant block copolymer was pelletized by the extruder, then melted and kneaded with polyphenylene ether and polystyrene in a twin screw extruder. After this, use was made of an IS-80A (5 oz injection molding machine) made by Toshiba Kikai K.K. to injection mold the same at 250° C. into a flat plate of a thickness of 3 mm.

*1: Use is made of a polyphenylene ether with an intrinsic viscosity of 0.57 dl/g (25° C., chloroform).
*2: Use is made of Styron 685 made by Asahi Chemical Industry Co., Ltd.
*3: According to ASTM D-1709
*4: According to JIS K-5400
*5: According to JIS K-6714
*6: According to JIS K-6871
*7: The state of occurrence of microcracks seen when bending and deforming a test piece based on the bending test method of ASTM D-790 was observed and the microcracking property evaluated according to the amount of deformation of the center of the test piece at the time of occurrence of the microcracks.
  ⊙ Amount of deformation at time of occurrence of microcracks over 10 mm (Excellent)
  ○ Occurrence of microcracks in range of deformation of over 3 mm and up to 10 mm (Good)
  × Occurrence of microcracks with amount of deformation up to 3 mm (Poor)
*8: The warping of the injection molded article was evaluated by the difference in the mold shrinkage rate since there is a large relationship between the warping of the injection molded articles and the difference in the mold shrinkage rates in the direction of flow of the molded article and the direction perpendicular to the same, the larger the difference, the larger the warping of the injection molded article.
  The warping was ranked as follows based on the differences in mold shrinkage rates:
  Up to 0.2%: ⊙ (Excellent)
  Over 0.2% and up to 0.4%: ○ (Good)
  Over 0.4% and up to 0.6%: Δ (Fair)
  Over 0.6%: × (Poor)
  Further, for the mold shrinkage rate in the direction perpendicular to the direction of flow, the mold shrinkage rate of the side opposite to the gate side was measured.

EXAMPLES 2, 3 AND 4 AND COMPARATIVE EXAMPLES 8 AND 9

The same method as in Example 1 was used to prepare a styrene-butadiene block copolymer with a polymer structure expressed by the general formula $A_1$-B-$A_2$. The same mixing with polyphenylene ether and polystyrene and molding were performed as in Example 1. The physical properties of the resultant injection molded articles are shown in Table 2. The block copolymer compositions within the scope of the present invention were superior in impact resistance, pencil hardness, and heat resistance, featured little warping of the molded articles, and were superior in gloss.

Figure 2:
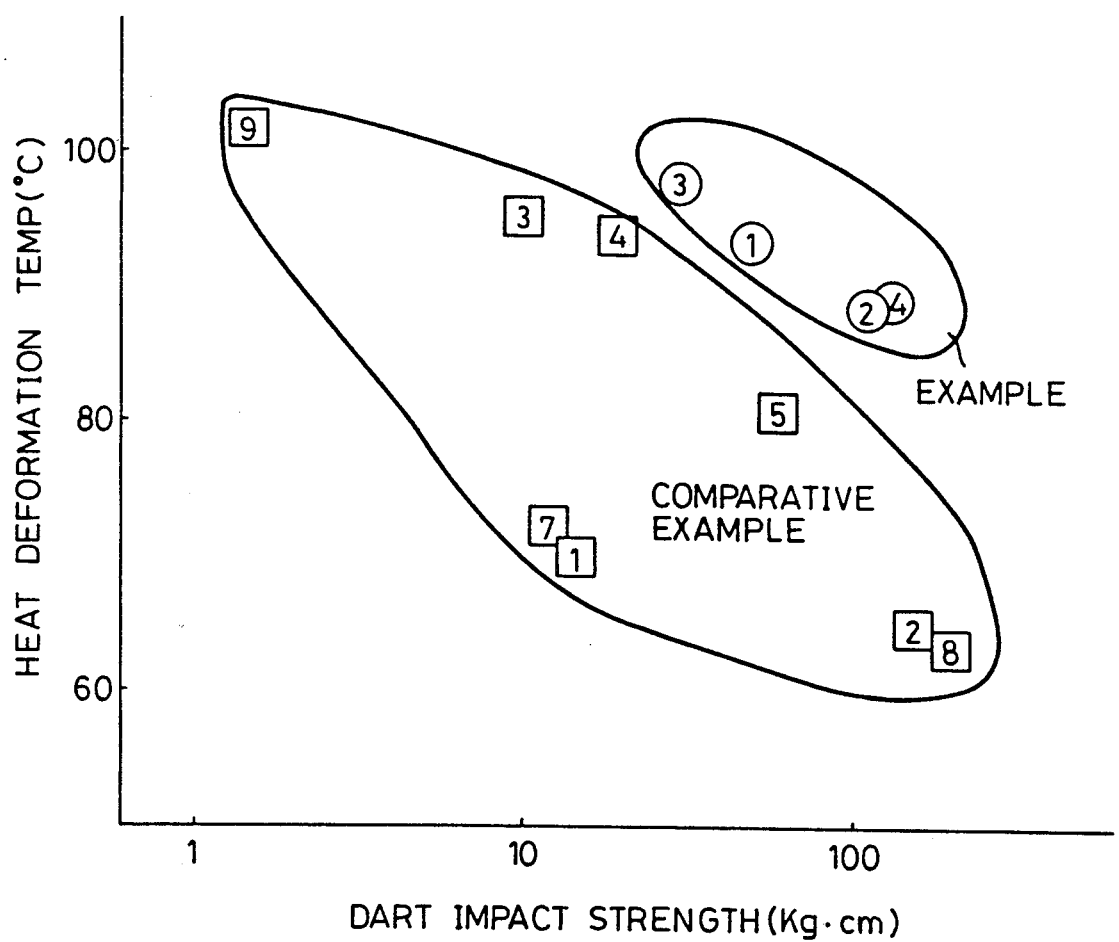
FIG. 2 graphically illustrates the correlation between the dart impact strength and the heat deformation temperature of the thermoplastic polymer composition.
Figure 3:
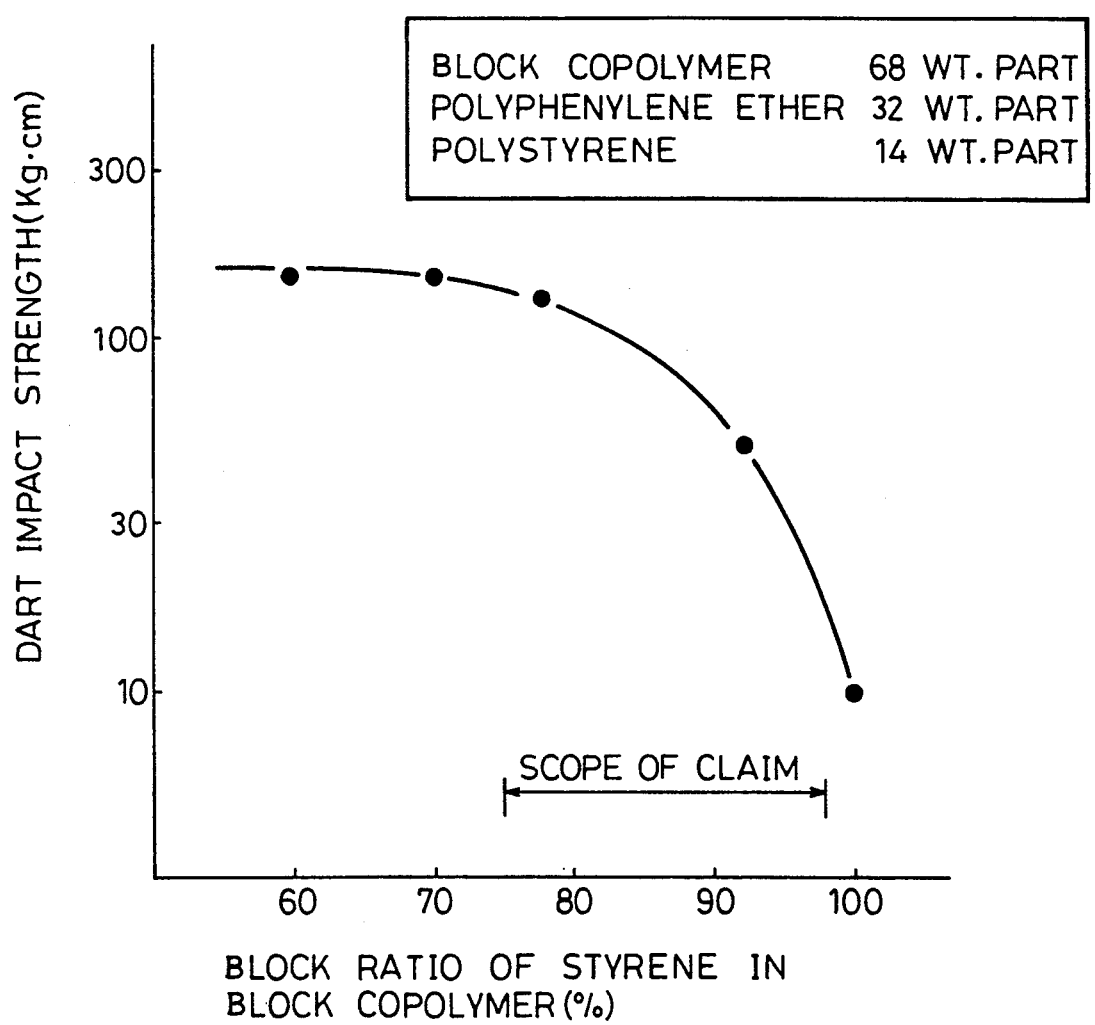
FIG. 3 graphically illustrates the correlation between the vinyl aromatic hydrocarbon polymer block content of the block copolymer and the dart impact strength of the polymer composition.
Figure 4:
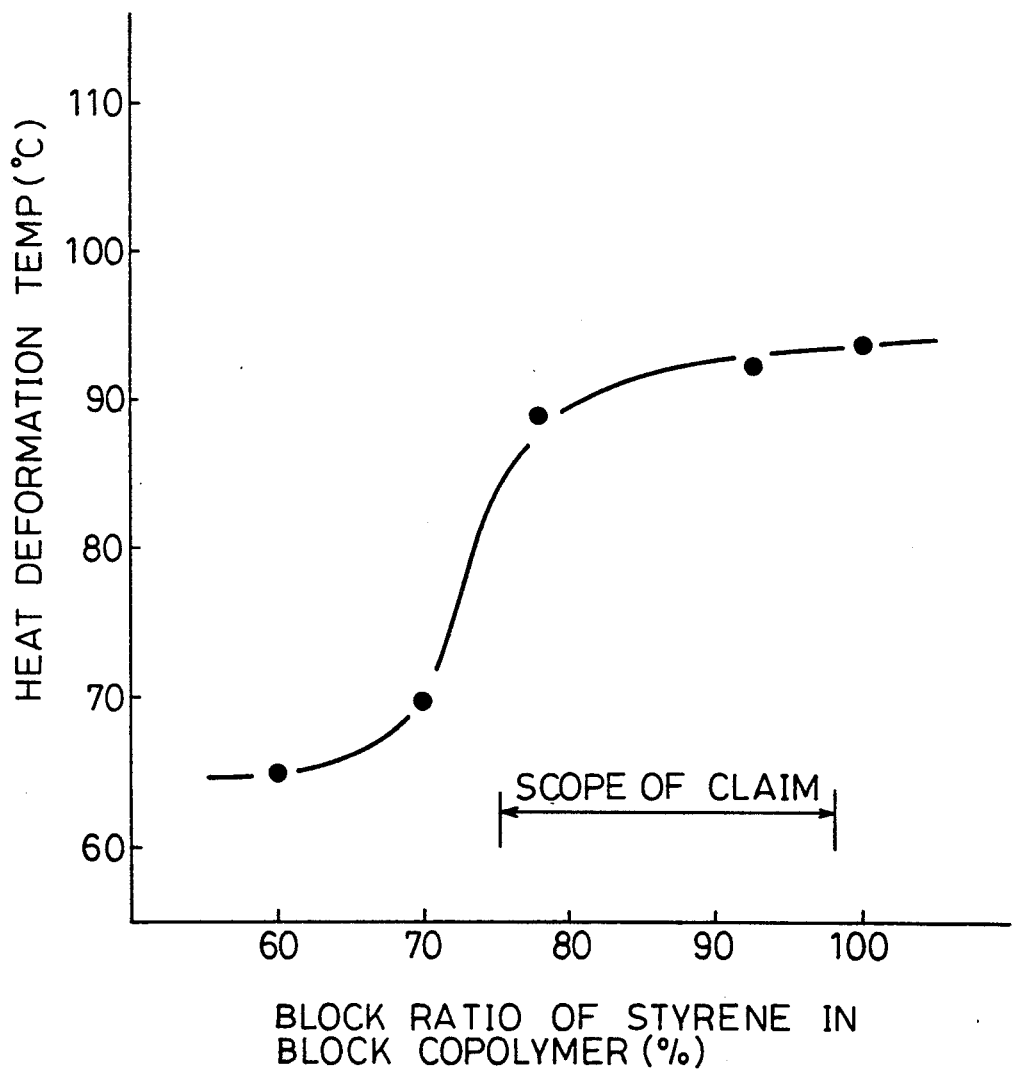
FIG. 4 graphically illustrates the correlation between the block vinyl aromatic hydrocarbon polymer block content of the block copolymer and the heat deformation temperature of the polymer composition.

The correlations between the dart impact strengths and the pencil hardness values in the Examples 1 to 4 and Comparative Examples 1 to 9 are shown in FIG. 1. Similarly, the correlations between the dart impact strengths and the heat deformation temperatures, between the block ratio of styrene in the block copolymers and the dart impact strengths, and between the block ratio of styrene in the block copolymers and the heat deformation temperatures are shown in FIGS. 2, 3, and 4, respectively. From these correlations in the Figures, it is clear that the block ratio of styrene in the block copolymer should be within the specified range of the present invention for obtaining the above-mentioned excellent and superior properties.

by Suga Shikenki to measure the deadend portion at an angle of incidence of 60°.
Evaluation ranking
⊙: More than 95% (Excellent)
Δ: More than 85% and less than 95% (Fair)
×: Less than 85% (Poor)

EXAMPLES 5 TO 9

A block copolymer with a polymer structure expressed by the general formula $B_1$-$A_1$-$B_2$-$A_2$-$A_1$-$B_1$-$A_2$-$B_2$-$A_3$ and $(A_1$-$B_1)_4X$ (wherein X indicates a residual group of $SiCl_4$) was prepared by the same method as in Example 1. The mixing with polyphenylene ether and polystyrene and the molding were performed in the same way as Example 1 too. The physical properties of the resultant injection molded articles are shown in Table 3.

EXAMPLE 10

A 100 parts by weight amount of the block copolymer composition of Example 1, 3 parts by weight of antimony trioxide, 30 parts by weight of decabromotetralin, and 35 parts by weight of glass fiber were melted and kneaded together to prepare a test piece for measurement of physical properties. The physical properties were measured and as a result superior physical properties were exhibited, i.e., excellent high impact resistance, high heat resistance, and scratch resistance and flame retardance.

TABLE 2

|  | Reference Example | Example | | | Comparative Example | |
| --- | --- | --- | --- | --- | --- | --- |
|  | 1 | 2 | 3 | 4 | 8 | 9 |
| Block Copolymer | | | | | | |
| Styrene content (wt %) | 80 | 70 | 90 | 80 | 50 | 98 |
| Block ratio of styrene (%) | 93 | 88 | 89 | 78 | 90 | 90 |
| MI (G) (g/10 min) | 8 | 11 | 1.2 | 7 | 9 | 10 |
| Mw/Mn of polystyrene block | 1.3 | 1.5 | 1.6 | 1.3 | 1.5 | 1.5 |
| Formulation ratio (wt · part) | | | | | | |
| Block copolymer |  |  |  | 68 |  |  |
| Polyphenylene ether |  |  |  | 32 |  |  |
| Polystyrene |  |  |  | 14 |  |  |
| Dart impact strength (Kg-cm) | 50 | 115 | 30 | 135 | >185 | 3 |
| Pencil hardness | F | HB | H | HB | 6B | 2H |
| Haze (%) | 2 | 3 | 2 | 2 | 25 | 2 |
| Heat deformation temp. (°C.) | 93 | 88 | 97 | 89 | 63 | 103 |
| Microcracking | o | o | o | o | ⊙ | x |
| Warping of molded article | o | o | o | o | o | o |
| Gloss of molded article *9 | o | o | o | o | x | o |

*9: Use was made of a dumbbell shaped test piece based on ASTM D638 and use made of a glossmeter made

TABLE 3

|  | Example 5 | Example 6 | Example 7 | Example 8 | Example 9 |
| --- | --- | --- | --- | --- | --- |
| Block copolymer | | | | | |
| Polymer structure | $B_1$-$A_1$-$B_2$-$A_2$ | $A_1$-$B_1$-$A_2$-$B_2$-$A_3$ | $(A_1$-$B_1)_4X$ | $(A_1$-$B_1)_4X$ | $A_1$-$B_1$-$A_2$ |
| Styrene content (wt %) | 80 | 81 | 79 | 79 | 80 |
| Block ratio of styrene (%) | 90 | 89 | 93 | 93 | 93 |
| MI (G) (g/10 min) | 11 | 9 | 7 | 7 | 8 |
| Mw/Mn of polystyrene block | 1.3 | 1.6 | 1.4 | 1.4 | 1.3 |
| Formulation ratio (wt · part) | | | | | |
| Block copolymer | 57 | 83 | 85 | 49 | 26 |
| Polyphenylene ether | 43 | 17 | 15 | 51 | 74 |
| Polystyrene | 43 | 39 | 7 | 22 | 32 |
| Dart impact strength (Kg-cm) | 56 | 42 | 30 | 27 | 21 |
| Pencil hardness | F | F | HB | H | 2H |
| Haze (%) | 3 | 4 | 2 | 2 | 2 |
| Heat deformation temp. (°C.) | 110 | 90 | 84 | 131 | 142 |
| Microcracking | o | o | o | o | o |
| Warping of molded article | o | o | o | o | o |

EXAMPLE 11

The styrene-butadiene block copolymer with a polymer structure having the general formula $A_1$-B-$A_2$ was produced in cyclohexane using n-butyl lithium as a catalyst. Thereafter, the block copolymer was hydrogenated using the Ti hydrogenation catalyst disclosed in Japanese Unexamined Patent Publication (Kokai) No. 59-133203 (i.e., U.S. Pat. No. 4,501,857) prepare a hydrogenated block copolymer with about 99% hydrogenated ratio of the aliphatic double bonds of the butadiene portion.

Next, the resultant hydrogenated block copolymer was melted and kneaded with polyphenylene ether and polystyrene in a twin screw extruder. The physical properties of the resultant composition are shown in Table 4.

TABLE 4

|  | Example 11 |
|---|---|
| Block copolymer | |
| Styrene content (wt %) | 75 |
| Block ratio of styrene (%) | 90 |
| Vinyl bond content of butadiene portion (%) | 30 |
| Polystyrene block Mw/Mn | 1.4 |
| Hydrogenated block copolymer | |
| Hydrogenated ratio (%) | 99 |
| MI (G) (g/10 min) | 10 |
| Formulation ratio (parts by weight) | |
| Block copolymer | 68 |
| Polyphenylene ether | 32 |
| Polystyrene | 14 |
| Dart impact strength (kg-cm) | 75 |
| Pencil hardness | F |
| Haze (%) | 3 |
| Heat deformation temperature (°C.) | 90 |
| Microcracking | o |
| Warping of molded article | o |

EXAMPLE 12

Compositions were prepared by replacing the polystyrene in the composition of Example 1 with styrene-methylmethacrylate copolymer, impact resistant rubber modified styrene copolymer (HIPS), acrylonitrile-butadiene-styrene copolymer (ABS), and methyl methacrylate-butadiene-styrene copolymer (MBS). The resultant compositions were all superior in impact resistance, surface hardness, and heat resistance.

EXAMPLES 13 TO 17 AND COMPARATIVE EXAMPLES 10 AND 11

The methods of Examples 1 to 5 and the Comparative Examples 8 and 9 were used, respectively, except that a polyphenylene ether having a stabilized end group was used as the polyphenylene ether. The polyphenylene ether used was prepared by oxidative coupling polymerization of the starting polyphenylene ether with 2,6-xylenol in the presence of dibutyl amine according to the method disclosed in U.S. Pat. No. 4,788,277.

The viscosity of the resultant polyphenylene ether was 0.545 and the glass transition temperature was about 208° C.

As a result of a $^1H$ nuclear magnetic resonance spectrum, it was confirmed that 0.32 of the end groups expressed by the formula

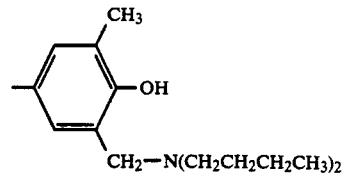

were present, based on 100 of the main repeating units:

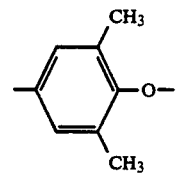

Further, the amount of the free phenolic hydroxyl groups was confirmed to be 0.34 per 100 of the above-mentioned main repeating units.

A 10 parts by weight amount of styrene were added to 100 parts by weight of the polyphenylene ether and the two blended homogeneously by a Henschel mixer. The mixture was then melted and kneaded by a twin screw extruder with a screw diameter of 30 mm$\phi$ (PCM-30 made by Ikegai Tekko K.K.) at a temperature of 300° C. and passed through a water vessel for pelletization.

The pellets thus obtained were analyzed by a $^1H$ nuclear magnetic resonance spectrum. As a result, it was confirmed from the 5.02 ppm signal area value that 0.25 of the end groups having the formula:

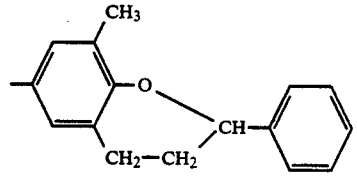

were present, based on 100 of the main repeating units. Further, the amount of the free phenolic hydroxyl groups was confirmed to be 0.45 per 100 of the above-mentioned main repeating units. Further, the number average molecular weight determined by GPC was 24,500 and the viscosity was 0.547.

The polyphenylene ether thus obtained (hereinafter, referred to as the polyphenylene ether resin A) the block copolymer, and conventional polystyrene were melted and kneaded in a twin screw extruder. Thereafter, use was made of an IS-80A (5 oz injection molding machine) made by Toshiba Kikai to injection mold the same at 250° C. into a flat plate of a thickness of 3 mm.

The physical properties of the resultant injection molded products are shown in Table 5. The polyphenylene ether B in Table 5 does not have the stabilized end group. The block copolymer compositions having a stabilized end group gives molded articles which are superior in impact resistance, pencil hardness, and heat resistance and clear color.

TABLE 5

| | Ex. 13 | Ref. 1 | Ex. 14 | Ref. 2 | Ex. 15 | Ref. 3 | Ex. 16 | Ref. 4 |
|---|---|---|---|---|---|---|---|---|

TABLE 5-continued

| Block copolymer | | | | | | | | |
|---|---|---|---|---|---|---|---|---|
| Styrene content (wt %) | 80 | 80 | 70 | 70 | 90 | 90 | 80 | 80 |
| Block ratio of styrene (%) | 93 | 93 | 88 | 88 | 89 | 89 | 78 | 78 |
| MI (G) (g/10 min) | 8 | 8 | 11 | 11 | 1.2 | 1.2 | 7 | 7 |
| Polystyrene block Mw/Mn | 1.3 | 1.3 | 1.5 | 1.5 | 1.6 | 1.6 | 3 | 3 |
| Kind of polyphenylene ether | A | B | A | B | A | B | A | B |
| Formulation ratio (wt · part) | | | | | | | | |
| Block copolymer | 68 | 68 | 68 | 68 | 68 | 68 | 68 | 68 |
| Polyphenylene ether | 32 | 32 | 32 | 32 | 32 | 32 | 32 | 32 |
| Polystyrene | 14 | 14 | 14 | 14 | 14 | 14 | 14 | 14 |
| Dart impact strength (kg-cm) | 54 | 50 | 115 | 115 | 35 | 30 | 140 | 135 |
| Pencil hardness | F | F | HB | HB | H | H | HB | HB |
| Haze (%) | 2 | 2 | 2 | 3 | 2 | 2 | 2 | 2 |
| Heat deformation temp. (°C.) | 94 | 93 | 91 | 88 | 100 | 97 | 92 | 89 |
| Microcracking | o | o | o | o | o | o | o | o |
| Warping of molded article | o | o | o | o | o | o | o | o |
| Lightness *L *8 | 81 | 63 | 80 | 65 | 78 | 60 | 76 | 62 |

| | Com. Ex. 10 | Ref. 8 | Com. Ex. 11 | Ref. 9 | Ex. 17 | Ref. 5 |
|---|---|---|---|---|---|---|
| Block copolymer | | | | | | |
| Styrene content (wt %) | 50 | 50 | 98 | 98 | 80 | 80 |
| Block ratio of styrene (%) | 90 | 90 | 90 | 90 | 90 | 90 |
| MI (G) (g/10 min) | 9 | 9 | 10 | 10 | 11 | 11 |
| Polystyrene block Mw/Mn | 1.5 | 1.5 | 1.5 | 1.5 | 1.3 | 1.3 |
| Kind of polyphenylene ether | A | B | A | B | A | B |
| Formulation ratio (wt · part) | | | | | | |
| Block copolymer | 68 | 68 | 68 | 68 | 57 | 57 |
| Polyphenylene ether | 32 | 32 | 32 | 32 | 43 | 43 |
| Polystyrene | 14 | 14 | 14 | 14 | 43 | 43 |
| Dart impact strength (kg-cm) | >185 | >185 | 5 | 3 | 58 | 56 |
| Pencil hardness | 6B | 6B | 2H | 2H | F | F |
| Haze (%) | 22 | 25 | 2 | 2 | 2 | 3 |
| Heat deformation temp. (°C.) | 63 | 63 | 104 | 103 | 112 | 110 |
| Microcracking | ⊚ | ⊚ | x | x | o | o |
| Warping of molded article | o | o | o | o | o | o |
| Lightness *L *8 | 77 | 60 | 75 | 57 | 71 | 52 |

*8: The L value was measured by a comprehensive visual measuring device made by Nippon Denshoku Kogyo K.K. to determine the lightness. The larger the L value, the more superior the apparent lightness.

EXAMPLE 18

In Example 11, only the polyphenylene ether was replaced with a polyphenylene ether having a stabilizing end group. The physical properties of the resultant composition are shown in Table 6. As is clear from the results shown in Table 6, even when the hydrogenated block copolymer is used, the use of the polyphenylene ether having a stabilizing end group gives clear or light color to the resultant composition.

TABLE 6

| | Example 14 | Example 11 |
|---|---|---|
| Block copolymer before hydrogenation | | |
| Styrene content (wt %) | 75 | 75 |
| Block ratio of styrene (%) | 90 | 90 |
| Content of vinyl bond of butadiene portion (%) | 30 | 30 |
| Mw/Mn of polystyrene block | 1.4 | 1.4 |
| Block copolymer after hydrogenation | | |
| Hydrogenated ratio (%) | 99 | 99 |
| MI (G) (g/10 min) | 10 | 10 |
| Formulation ratio (wt · parts) | | |
| Block copolymer | 68 | 68 |
| Polyphenylene ether | (A) 32 | (B) 32 |
| Polystyrene | 14 | 14 |
| Dart impact strength (kg-cm) | 77 | 75 |
| Pencil hardness | F | F |
| Haze (%) | 3 | 3 |
| Heat deformation temperature (°C.) | 90 | 90 |
| Microcracking | o | o |
| Warping of molded article | o | o |
| Lightness *L | 82 | 65 |

EXAMPLES 18 TO 27 AND COMPARATIVE EXAMPLES 12 TO 15

In Example 1, the polystyrene used as the component (C) was removed from the polymer composition and the polymer composition shown in Table 7 was prepared in the same manner as in Example 1. The polyphenylene ethers A and B used are the same as those used in the Examples 13 to 19 and Comparative Examples 10 and 11.

The resultant polymer compositions were injection molded and the physical properties were evaluated. The results are shown in Table 7.

As is clear from the results shown in Table 7, the present polymer compositions composed of the two components, i.e., the block copolymer (a) and the polyphenylene ether (b) exhibited the excellent transparency, impact strength, heat resistance, and surface hardness. Furthermore, when the polyphenylene ether having a stabilizing end group, the resultant composition is excellent in the lightness in color.

TABLE 7

| | Example | | | | | | | | | |
|---|---|---|---|---|---|---|---|---|---|---|
| | 18 | 19 | 20 | 21 | 22 | 23 | 24 | 25 | 26 | 27 |
| Block styrene content | | | | | | | | | | |
| Styrene content (wt %) | 80 | 80 | 70 | 70 | 90 | 90 | 80 | 80 | 80 | 80 |
| Block ratio of styrene (%) | 93 | 93 | 88 | 88 | 89 | 89 | 78 | 78 | 90 | 90 |
| MI (G) (g/10 min) | 8 | 8 | 11 | 11 | 1.2 | 1.2 | 7 | 7 | 11 | 11 |
| Polystyrene block Mw/Mn | 1.3 | 1.3 | 1.5 | 1.5 | 1.6 | 1.6 | 3 | 3 | 1.3 | 1.3 |
| Type of polyphenylene ether | A | B | A | B | A | B | A | B | A | B |
| Formulation ratio | | | | | | | | | | |
| Block copolymer | 68 | 68 | 68 | 68 | 68 | 68 | 68 | 68 | 50 | 50 |
| Polyphenylene ether | 32 | 32 | 32 | 32 | 32 | 32 | 32 | 32 | 50 | 50 |
| Dart impact strength (kg-cm) | 58 | 54 | 120 | 118 | 36 | 31 | 147 | 139 | 73 | 70 |
| Pencil hardness | F | F | HB | HB | H | H | HB | HB | H | H |
| Haze (%) | 2 | 2 | 3 | 3 | 2 | 2 | 3 | 3 | 2 | 2 |
| Heat deformation temp. (°C.) | 101 | 99 | 95 | 93 | 105 | 101 | 98 | 95 | 122 | 119 |
| Microcracking | o | o | o | o | o | o | o | o | o | o |
| Warping of molded article | o | o | o | o | o | o | o | o | o | o |
| Lightness *L | 79 | 61 | 77 | 59 | 80 | 63 | 76 | 59 | 72 | 56 |

| | Comparative Example | | | |
|---|---|---|---|---|
| | 12 | 13 | 14 | 15 |
| Block styrene content | | | | |
| Styrene content (wt %) | 50 | 50 | 98 | 98 |
| Block ratio of styrene (%) | 90 | 90 | 90 | 90 |
| MI (G) (g/10 min) | 9 | 9 | 10 | 10 |
| Polystyrene block Mw/Mn | 1.5 | 1.5 | 1.5 | 1.5 |
| Type of polyphenylene ether | A | B | A | B |
| Formulation ratio | | | | |
| Block copolymer | 68 | 68 | 68 | 68 |
| Polyphenylene ether | 32 | 32 | 32 | 32 |
| Dart impact strength (kg-cm) | >185 | >185 | 6 | 4 |
| Pencil hardness | 6B | 6B | 2H | 2H |
| Haze (%) | 26 | 30 | 2 | 2 |
| Heat deformation temp. (°C.) | 65 | 63 | 125 | 123 |
| Microcracking | ⊙ | ⊙ | x | x |
| Warping of molded article | o | o | o | o |
| Lightness *L | 75 | 59 | 74 | 56 |

We claim:

1. A thermoplastic polymer composition comprising:
   (a) 10 to 95 parts by weight of a block copolymer which comprises at least two polymer segments comprised mainly of a vinyl aromatic hydrocarbon and at least one polymer segment comprised mainly of a conjugated diene, in which block copolymer:
   (i) the content of the vinyl aromatic hydrocarbon is more than 60% by weight and not more than 95% by weight;
   (ii) the weight ratio of the vinyl aromatic hydrocarbon polymer block contained in the block copolymer to the total vinyl aromatic hydrocarbon contained in the block copolymer is more than 0.75 to 0.98; and
   (iii) the ratio of the weight average molecular weight to the number average molecular weight of the vinyl aromatic hydrocarbon polymer block in the block copolymer is 1.2 to 2.0; and
   (b) 5 to 90% by weight of a polyphenylene ether.

2. The thermoplastic polymer composition as claimed in claim 1, wherein (i) the content of the vinyl aromatic hydrocarbon in the block copolymer (a) is 65 to 90% by weight and (ii) the weight ratio of the vinyl aromatic hydrocarbon contained in the block copolymer to the total vinyl aromatic hydrocarbon contained in the block copolymer is 0.77 to 0.96.

3. The thermoplastic polymer composition as claimed in claim 1, wherein (iii) the ratio of the weight average molecular weight to the number average molecular weight of the vinyl aromatic hydrocarbon polymer block in the block copolymer is 1.3 to 1.8.

4. The thermoplastic polymer composition as claimed in claim 1, wherein the block copolymer (a) has a glass transition temperature of the polymer segment comprising mainly a vinyl aromatic hydrocarbon of 65° to 98° C.

5. The thermoplastic polymer composition as claimed in claim 1, wherein the vinyl aromatic hydrocarbon is at least one compound selected from the group consisting of styrene, o-methylstyrene, p-methylstyrene, p-tert-butylstyrene, 1,3-dimethylstyrene, α-methylstyrene, vinylnaphthalene, and vinyl anthracene.

6. The thermoplastic polymer composition as claimed in claim 1, wherein the conjugated diene is at least one compound selected from the group consisting of 1,3-butadiene, 2-methyl-1,3-butadiene, 2,3-dimethyl-1,3-butadiene, 1,3-pentadiene, and 1,3-hexadiene.

7. The thermoplastic polymer composition as claimed in claim 1, wherein said polyphenylene ether is at least one polymer selected from the group consisting of:
   a homopolymer of the repeating unit (I):

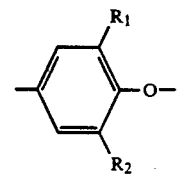

(I)

wherein, at least one of $R_1$ and $R_2$ is a linear chain or a primary or secondary branch chain $C_1$-$C_4$ alkyl group, allyl group, halogen atom, or hydrogen atom, which are the same or different;

a copolymer comprising of the repeating unit (I) and the repeating unit (II)

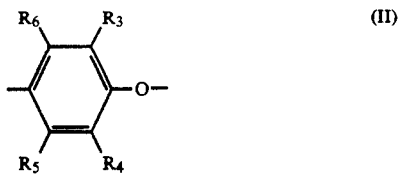
(II)

wherein, $R_3$, $R_4$, $R_5$, and $R_6$ are each a linear chain or a primary or secondary branch chain $C_1$-$C_4$ alkyl group, allyl group, halogen atom, hydrogen atom, which are the same or mutually different, except that $R_3$ and $R_4$ are not simultaneously a hydrogen atom; and a graft copolymer formed by graft polymerization of styrene with the homopolymer or copolymer.

8. The thermoplastic polymer composition as claimed in claim 1, wherein (b) is said polyphenylene ether having a stabilizing end group.

9. The thermoplastic polymer composition as claimed in claim 8, wherein said stabilizing end group has the following structure (IV):

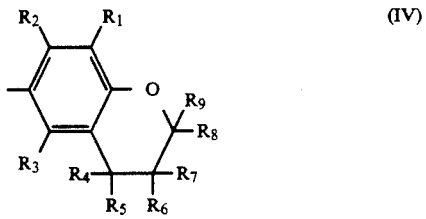
(IV)

wherein $R_1$ to $R_5$ are independently hydrogen, an alkyl group, substituted alkyl group, halogen group, aryl group, or substituted aryl group, $R_6$ to $R_9$ are independently hydrogen, an alkyl group, substituted alkyl group, alkenyl group, substituted alkenyl group, halogen group, aryl group, substituted aryl group, alkoxyl group, N-lactam group, carboxylic acid group, carboxylic acid anhydride group, carboxylic acid ester group, carboxylic acid amide group, nitrile group, acyloxyl group, or acyl group, provided that $R_6$ and $R_7$, $R_8$ and $R_9$ are independently bonded to form a spirocyclic structure ring and wherein an average number of the end groups is 0.01 or more, based on 100 phenylene ether units.

10. The thermoplastic polymer composition as claimed in claim 8, wherein the average molecular weight of the polyphenylene ether is 10,000 to 30,000 and the average number of the end groups based on 100 phenylene ether units, is 0.15 or more.

11. The thermoplastic polymer composition as claimed in claim 1, wherein 3% or more of the aliphatic double bond derived from the conjugated diene is hydrogenated in said block copolymer.

12. The thermoplastic polymer composition as claimed in claim 1, further comprising 3 to 400 parts by weight, based on 100 parts by weight of the total weight of said components (a) and (b), of a styrenic polymer (c).

13. The thermoplastic polymer composition as claimed in claim 12, wherein said styrenic polymer is at least one polymer selected from the group consisting of polystyrenes, styrene-α-methyl styrene copolymers, acrylonitrile-styrene copolymers, styrene-methacrylic acid ester copolymers, and styrene-maleic anhydride copolymers.

14. The thermoplastic polymer composition as claimed in claim 12, wherein (i) the content of the vinyl aromatic hydrocarbon in the block copolymer (a) is 65 to 90% by weight and (ii) the weight ratio of the vinyl aromatic hydrocarbon contained in the block copolymer to the total vinyl hydrocarbon contained in the block copolymer is 0.77 to 0.96.

15. The thermoplastic polymer composition as claimed in claim 12, wherein (iii) the ratio of the weight average molecular weight to the number average molecular weight of the vinyl aromatic hydrocarbon polymer block in the block copolymer is 1.3 to 1.8.

16. The thermoplastic polymer composition as claimed in claim 12, wherein the block copolymer (a) has a glass transition temperature of the polymer segment comprising mainly a vinyl aromatic hydrocarbon of 65° to 98° C.

17. The thermoplastic polymer composition as claimed in claim 12, wherein the vinyl aromatic hydrocarbon is at least one compound selected from the group consisting of styrene, o-methylstyrene, p-methylstyrene, p-tert-butylstyrene, 1,3-dimethylstyrene, α-methylstyrene, vinylnaphthalene, and vinyl anthracene.

18. The thermoplastic polymer composition as claimed in claim 12, wherein the conjugated diene is at least one compound selected from the group consisting of 1,3-butadiene, 2-methyl-1,3-butadiene, 2,3-dimethyl-1,3-butadiene, 1,3-pentadiene, and 1,3-hexadiene.

19. The thermoplastic polymer composition as claimed in claim 12, wherein said polyphenylene ether is at least one polymer selected from the group consisting of:

homopolymers of the repeating unit (I):

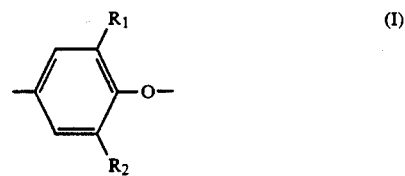
(I)

wherein, at least one of $R_1$ and $R_2$ is a linear chain or primary or secondary branch $C_1$-$C_4$ alkyl group, allyl group, halogen atom, or hydrogen atom, which are the same or different;

a copolymer comprising of the repeating unit (I) and the repeating unit (II)

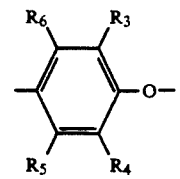

wherein, $R_3$, $R_4$, $R_5$, and $R_6$ are each a linear chain or a primary or secondary branch cahin $C_1$-$C_4$ alkyl group, allyl group, halogen atom, or hydrogen atom, which are the same or mutually different, except that $R_3$ and $R_4$ are not simultaneously a hydrogen atoms; and a graft copolymer by graft polymerization of styrene with the homopolymer or copolymer.

20. The thermoplastic polymer composition as claimed in claim 12, wherein said polyphenylene ether has a stabilizing end group.

21. The thermoplastic polymer composition as claimed in claim 20, wherein said stabilizing end group has the following structure (IV):

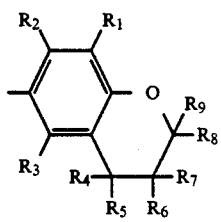

(IV)

wherein $R_1$ to $R_5$ are independently hydrogen, an alkyl group, substituted alkyl group, halogen group, aryl group, or substituted aryl group, $R_6$ to $R_9$ are independently hydrogen, an alkyl group, substituted alkyl group, alkenyl group, substituted alkenyl group, halogen group, aryl group, substituted aryl group, alkoxyl group, N-lactam group, carboxylic acid group, carboxylic acid anhydride group, carboxylic acid ester group, carboxylic acid amide group, nitrile group, acyloxyl group, or acyl group, provided that $R_6$ and $R_7$, $R_8$ and $R_9$ are independently bonded to form spirocyclic structure ring and wherein an average number of the end group is 0.01 or more, based on 100 phenylene ether units.

22. The thermoplastic polymer composition as claimed in claim 20, wherein the average molecular weight of the polyphenylene ether is 10,000 to 30,000 and the average number of the end groups, based on 100 phenylene ether units is 0.15 or more.

23. The thermoplastic polymer composition as claimed in claim 12, wherein 3% or more of the aliphaic double bond derived from the conjugated diene is hydrogenated in said block copolymer.

* * * * *